United States Patent
Jin et al.

(10) Patent No.: US 12,395,250 B2
(45) Date of Patent: Aug. 19, 2025

(54) EMF STRENGTH CONTROL METHOD AND COMMUNICATION APPARATUS

(71) Applicant: HUAWEI TECHNOLOGIES CO., LTD., Shenzhen (CN)

(72) Inventors: Tao Jin, Shanghai (CN); Yunhan Zhang, Shanghai (CN); Chunlin Xue, Shanghai (CN); Lin Huang, Shanghai (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 434 days.

(21) Appl. No.: 18/156,653

(22) Filed: Jan. 19, 2023

(65) Prior Publication Data
US 2023/0155695 A1    May 18, 2023

Related U.S. Application Data

(63) Continuation of application No. PCT/CN2021/106878, filed on Jul. 16, 2021.

(30) Foreign Application Priority Data

Jul. 20, 2020   (CN) .................. 202010700367.X

(51) Int. Cl.
*H04B 17/10*     (2015.01)
*H04W 52/14*    (2009.01)
*H04W 16/28*    (2009.01)

(52) U.S. Cl.
CPC ........ *H04B 17/102* (2015.01); *H04W 52/143* (2013.01); *H04W 16/28* (2013.01)

(58) Field of Classification Search
CPC ..... H04B 17/10; H04B 17/102; H04W 52/14; H04W 52/143; H04W 16/28
See application file for complete search history.

(56) References Cited

U.S. PATENT DOCUMENTS 8,195,171 B2 *  6/2012  Bernini ................. H04W 16/22
                                                                    455/446
9,451,486 B2 *  9/2016  Fonseca Dos Santos ...................
                                                                    H04W 24/08
(Continued)

FOREIGN PATENT DOCUMENTS

CN     101651481 A     2/2010
CN     102480742 A     5/2012
(Continued)

OTHER PUBLICATIONS

Extended European Search Report issued in corresponding European Application No. 21846016.0, dated Nov. 17, 2023, pp. 1-8.
(Continued)

*Primary Examiner* — Hai V Nguyen
(74) *Attorney, Agent, or Firm* — HAUPTMAN HAM, LLP

(57) ABSTRACT

A network device obtains EMF strength of each grid in a first grid group. The first grid group includes M grids obtained by dividing a signal coverage area of the network device, and M is an integer greater than 1. The network device determines a second grid group based on EMF strength of the M grids. The second grid group includes at least a first grid and a second grid, a coverage area of the first grid is greater than that of the second grid, and EMF strength of the first grid is lower than EMF strength of the second grid. The network device monitors EMF strength of a coverage area of the second grid group based on the second grid group, to adjust the EMF strength of the coverage area of the second grid group.

14 Claims, 6 Drawing Sheets

(56) References Cited

U.S. PATENT DOCUMENTS

| | | | |
|---|---|---|---|
| 10,751,126 B2* | 8/2020 | Koyrakh | A61B 34/20 |
| 10,846,511 B2* | 11/2020 | Ozkucur | G06F 18/22 |
| 11,423,677 B2* | 8/2022 | Ozkucur | G06F 18/22 |
| 11,463,146 B2* | 10/2022 | Nilsson | H04B 7/0695 |
| 2012/0258730 A1* | 10/2012 | Tinnakornsrisuphap | G01S 5/0215 455/456.1 |
| 2012/0302261 A1* | 11/2012 | Tinnakornsrisuphap | H04W 64/00 455/456.4 |
| 2012/0302263 A1* | 11/2012 | Tinnakornsrisuphap | H04W 64/00 455/456.6 |
| 2014/0099964 A1* | 4/2014 | Lee | H04W 16/18 455/448 |
| 2014/0146700 A1* | 5/2014 | Fonseca Dos Santos | H04W 16/14 370/252 |
| 2014/0233442 A1 | 8/2014 | Atias et al. | |
| 2015/0341749 A1 | 11/2015 | Jodlauk et al. | |
| 2017/0269201 A1 | 9/2017 | Adachi et al. | |
| 2017/0331670 A1* | 11/2017 | Parkvall | H04W 52/028 |
| 2018/0116722 A1* | 5/2018 | Koyrakh | A61B 34/10 |
| 2019/0328620 A1* | 10/2019 | Cohen | A61B 5/065 |
| 2020/0202107 A1* | 6/2020 | Ozkucur | G06F 18/22 |
| 2020/0329340 A1* | 10/2020 | Rahman | H04B 17/382 |
| 2021/0042500 A1* | 2/2021 | Ozkucur | G05D 1/0246 |
| 2022/0109483 A1* | 4/2022 | Nilsson | H04B 7/0695 |
| 2023/0160992 A1* | 5/2023 | Wang | H04B 17/328 342/417 |
| 2023/0171810 A1* | 6/2023 | Belleschi | H04W 74/0833 370/329 |
| 2024/0089818 A1* | 3/2024 | Abotabl | H04W 36/00837 |
| 2024/0172002 A1* | 5/2024 | Chen | H04W 76/30 |
| 2024/0292344 A1* | 8/2024 | Guo | H04W 52/367 |
| 2024/0333407 A1* | 10/2024 | Yuan | H04L 5/0023 |
| 2024/0357516 A1* | 10/2024 | Guo | H04W 52/367 |
| 2024/0418692 A1* | 12/2024 | Myron | G06Q 50/40 |
| 2024/0421916 A1* | 12/2024 | Myron | H04B 11/00 |

FOREIGN PATENT DOCUMENTS

| | | | | |
|---|---|---|---|---|
| CN | 102546039 A | | 7/2012 | |
| CN | 104378769 A | | 2/2015 | |
| CN | 105372506 A | | 3/2016 | |
| CN | 106465142 A | | 2/2017 | |
| CN | 108260075 A | | 7/2018 | |
| CN | 108271117 A | | 7/2018 | |
| CN | 109548041 A | * | 3/2019 | H04W 24/10 |
| CN | 109581073 A | * | 4/2019 | G01R 29/08 |
| CN | 110062343 A | | 7/2019 | |
| CN | 110996345 A | | 4/2020 | |
| CN | 111385804 A | | 7/2020 | |
| CN | 111385805 A | | 7/2020 | |
| CN | 113038487 A | * | 6/2021 | H04W 16/18 |
| EP | 0221228 A1 | | 5/1987 | |
| WO | 2014190528 A1 | | 12/2014 | |
| WO | 2017193554 A1 | | 11/2017 | |
| WO | 2017211178 A1 | | 12/2017 | |

OTHER PUBLICATIONS

Zhong Ding et al., Application of MR-based Grid Analysis Method in TD-SCDMA Network. Electronic Science and Technology, vol. 26, No. 3, Mar. 15, 2013, 3 pages.

International Search Report issued in corresponding International Application No. PCT/CN2021/106878, dated Sep. 18, 2021, pp. 1-10.

Chinese Office Action issued in corresponding Chinese Application No. 202010700367.X, dated Mar. 9, 2023, pp. 1-7.

Chinese Office Action issued in corresponding Chinese Application No. 202010700367.X, dated Sep. 22, 2022, pp. 1-8.

* cited by examiner

EMF STRENGTH CONTROL METHOD AND COMMUNICATION APPARATUS

This application is a continuation of International Application No. PCT/CN2021/106878, filed on Jul. 16, 2021, which claims priority to Chinese Patent Application No. 202010700367.X, filed on Jul. 20, 2020. The disclosures of the aforementioned applications are incorporated herein by reference in their entireties.

TECHNICAL FIELD

Embodiments of this application relate to the field of communication technologies, and in particular, to an electromagnetic field (EMF) strength control method and a communication apparatus.

BACKGROUND

With development of communication technologies, a higher requirement is imposed on communication quality of a network device. To improve a communication capability of the network device, a massive multiple-input multiple-output (MM) technology has started to be applied in an actual communication process. By using the MM technology, the network device may communicate with users over narrow beams. Narrow beams can provide more accurate signal transmission, and have smaller signal superposition between different users in a communication process compared with wide beams. Therefore, quality of communication between the network device and the different users can be effectively improved.

Larger electromagnetic field (EMF) strength in signal coverage indicates better communication quality of communication between the network device and users in a corresponding direction. However, due to regulation requirements, the EMF strength of the network device in the signal coverage of the network device cannot be excessively high. Therefore, the network device needs to monitor the EMF strength in the signal coverage of the network device, and adjust EMF strength distribution based on a monitoring result (for example, reduce the EMF strength to a value within a compliance range by reducing transmit power).

Currently, the network device may evenly divide an area in the signal coverage of the network device into a plurality of sub-areas (or referred to as grids), determine EMF strength of each grid by monitoring the EMF strength in each grid, and accordingly adjust the EMF strength distribution.

It may be understood that finer grid division helps the network device make more accurate adjustment for the EMF strength distribution. In this way, on the premise of compliance with regulations, the network device can maximally improve the EMF strength in the signal coverage, to improve communication quality. However, simultaneously monitoring EMF strength of a large quantity of grids obtained through fine division causes huge pressure on the network device, and even affects normal running of the network device.

SUMMARY

Embodiments of this application provide an electromagnetic field (EMF) strength control method and a communication apparatus, so that a size of a grid in an EMF strength monitoring process can be adaptively adjusted, thereby reducing processing pressure of a network device while improving EMF strength control precision, by adjusting a spatial domain resolution of the grid.

To achieve the foregoing objective, the following technical solutions are used in embodiments of this application.

According to a first aspect, an electromagnetic field (EMF) strength control method is provided. The method includes: A network device obtains EMF strength of each grid in a first grid group. The first grid group includes M grids obtained by dividing a signal coverage area of the network device, and M is an integer greater than 1. The network device determines a second grid group based on EMF strength of the M grids. The second grid group includes at least a first grid and a second grid, a coverage area of the first grid is greater than that of the second grid, and EMF strength of the first grid is lower than EMF strength of the second grid. The network device monitors EMF strength of the signal coverage area of the network device based on the second grid group, to adjust the EMF strength of the signal coverage area.

Based on this solution, the network device may adjust a coverage area of each grid in the first grid group based on EMF strength distribution of the grids in the first grid group, for example, combine adjacent grids with weak EMF strength, or split a grid with strong EMF strength. A grid granularity is flexibly adjusted based on communication requirement distribution, so that the grids are adaptively adjusted, thereby reducing processing pressure of the network device while improving EMF strength control precision.

In a possible implementation, the determining a second grid group based on EMF strength of the M grids includes: The network device combines, based on the EMF strength of the M grids, two or more adjacent grids that each have EMF strength lower than a first threshold in the M grids. The network device determines a grid obtained through combination and an uncombined grid as the second grid group. Based on this solution, a specific method for reducing a quantity of grids is provided. To be specific, two or more adjacent grids that each have EMF strength lower than the first threshold are combined. It should be understood that, in this example, if EMF strength is lower than the first threshold, it indicates that a communication requirement of an area in which a corresponding grid is located is weak. Therefore, EMF monitoring may be performed on the area by using a large granularity. For example, monitoring at a large granularity may be implemented by combining grids.

In a possible implementation, the determining a second grid group based on EMF strength of the M grids includes: The network device splits, based on the EMF strength of the M grids, a grid whose EMF strength is greater than a second threshold in the M grids. The network device determines grids obtained through splitting and an unsplit grid as the second grid group. Based on this solution, a specific grid refinement method is provided. To be specific, the grid whose EMF strength is greater than the second threshold is split, to obtain, in the corresponding area, more grids that each have a small granularity, so as to implement refined monitoring on an area in which a communication requirement is strong. Therefore, precise EMF strength obtained in this way may be used to perform accurate EMF strength control.

In a possible implementation, that the network device determines a second grid group based on EMF strength of the M grids includes: The network device combines, based on the EMF strength of the M grids, two or more adjacent grids that each have EMF strength lower than a first threshold in the M grids, and splits a grid whose EMF strength is greater than a second threshold in the M grids. The network device determines a grid obtained through combination, grids obtained through splitting, and an uncombined grid/unsplit grid as the second grid group. Based on this solution, another grid optimization solution is provided. To be specific, grids of areas in which communication requirements are weak (for example, areas corresponding to grids that each have EMF strength lower than the first threshold) are combined, to obtain a grid having a large granularity, so that the processing pressure of the network device is reduced. A grid of an area in which a communication requirement is strong is split, to obtain grids each having a small granularity, so as to implement the refined monitoring on the area in which the communication requirement is strong. It should be noted that in this application, the combination operation and the splitting operation may be performed simultaneously, or may be performed in a sequence. The sequence is not limited in this application.

In a possible implementation, before the splitting, by the network device, a grid whose EMF strength is greater than a second threshold in the M grids, the method further includes: The network device determines that a quantity of grids in the second grid group obtained through splitting is lower than a third threshold. Based on this solution, the network device may determine, by determining a value relationship between the third threshold and a quantity of a large quantity of grids obtained through splitting, whether the network device has a capability of processing the grids obtained through splitting. When it is determined that the network device can process the grids obtained through splitting, the splitting operation may be performed. On the contrary, if the network device cannot process the large quantity of grids obtained through splitting, the splitting action may be properly adjusted, so that the quantity of grids obtained through splitting can be smoothly processed by the network device. For example, a quantity of grids in a corresponding area obtained through splitting may be properly reduced. For another example, grids corresponding to areas that each have EMF strength greater than the first threshold and a communication requirement still weak may be combined, to release a processing capability of the network device, so that the network device can perform refined monitoring on an area whose EMF strength is high.

In a possible implementation, EMF strength of the grid is an average value of EMF strength of the grid within preset time. Based on this solution, a possible EMF strength determining method is provided. To be specific, an average value of EMF strength within preset time is used as EMF strength of a corresponding grid. It may be understood that, because EMF strength changes in real time with a communication requirement, the average value of EMF strength within preset time is used as the EMF strength of the corresponding grid, so that a communication requirement of a corresponding area can be more accurately reflected. Certainly, in some other implementations of this application, to reduce time consumption of an entire processing procedure and reduce processing pressure of the network device, EMF strength at a moment may alternatively be used as the EMF strength of the corresponding grid.

In a possible implementation, the method further includes: determining, by the network device, current available transmit power based on the EMF strength of the M grids. The determining a second grid group includes: determining, by the network device, the second grid group based on the current available transmit power. Based on this solution, a possible solution in which the network device determines the second grid group is provided. For example, with reference to the foregoing implementation, the network device may determine, based on EMF strength of each grid, whether to split and/or combine the corresponding grid. In a specific implementation, the network device may obtain transmit power in a direction corresponding to an area of a grid, to determine an EMF strength status of the grid. In this example, the network device may determine, based on a difference between maximum power that can be transmitted in the direction and current transmit power, whether EMF strength can be further increased in the direction. If the EMF strength can be further increased, it indicates that a grid in the direction may be further split. In other words, the network device can further process EMF monitoring of more grids. In this way, the network device can perform splitting processing on the corresponding grid. If the network device cannot increase the transmit power in the corresponding direction, it indicates that the grid in the direction already cannot be split. If the grid is still split, the network device cannot smoothly perform EMF monitoring on grids obtained through splitting. Therefore, this solution provides a reference mechanism for determining, by the network device, whether to perform grid splitting/combination, so that the network device can smoothly perform EMF strength monitoring on the second grid group obtained through splitting/combination.

According to a second aspect, a communication apparatus is provided. The apparatus includes the following units. An obtaining unit is configured to obtain EMF strength of each grid in a first grid group, where the first grid group includes M grids obtained by dividing a signal coverage area of a network device, and M is an integer greater than 1. A determining unit is configured to determine a second grid group based on EMF strength of the M grids, where the second grid group includes at least a first grid and a second grid, a coverage area of the first grid is greater than that of the second grid, and EMF strength of the first grid is lower than EMF strength of the second grid. An adjustment unit is configured to monitor EMF strength of the signal coverage area of the network device based on the second grid group, to adjust the EMF strength of the signal coverage area.

In a possible implementation, the determining unit is specifically configured to: combine, based on the EMF strength of the M grids, two or more adjacent grids that each have EMF strength lower than a first threshold in the M grids; and determine a grid obtained through combination and an uncombined grid as the second grid group.

In a possible implementation, the determining unit is specifically configured to: split, based on the EMF strength of the M grids, a grid whose EMF strength is greater than a second threshold in the M grids; and determine grids obtained through splitting and an unsplit grid as the second grid group.

In a possible implementation, the determining unit is specifically configured to: based on the EMF strength of the M grids, combine two or more adjacent grids that each have EMF strength lower than a first threshold in the M grids, and split a grid whose EMF strength is greater than a second threshold in the M grids; and determine a grid obtained through combination, grids obtained through splitting, and an uncombined grid/unsplit grid as the second grid group.

In a possible implementation, the determining unit is further configured to determine that a quantity of grids in the second grid group obtained through splitting is lower than a third threshold.

In a possible implementation, EMF strength of the grid is an average value of EMF strength of the grid within preset time.

In a possible implementation, the determining unit is further configured to determine current available transmit power based on the EMF strength of the M grids; and the determining unit is further configured to determine the second grid group based on the current available transmit power.

According to a third aspect, a communication apparatus is provided. The communication apparatus includes one or more processors and one or more memories. The one or more memories are coupled to the one or more processors, and the one or more memories store computer instructions. When the one or more processors execute the computer instructions, the network device is enabled to perform the EMF strength control method according to any one of the first aspect or the possible implementations of the first aspect.

According to a fourth aspect, a non-transitory computer-readable storage medium is provided. The computer-readable storage medium includes computer instructions, and when the computer instructions are run, the EMF strength control method according to any one of the first aspect or the possible implementations of the first aspect is performed.

According to a fifth aspect, a chip system including a processing circuit and an interface is provided. The processing circuit is configured to invoke, from a storage medium, and run a computer program stored in the storage medium, to perform the EMF strength control method according to any one of the first aspect or the possible implementations of the first aspect.

According to a sixth aspect, a computer program product is provided. When the computer program product runs on a computer, the computer is enabled to perform the EMF strength control method according to any one of the first aspect or the possible implementations of the first aspect.

It may be understood that the communication apparatus according to the second aspect, the communication apparatus according to the third aspect, the computer-readable storage medium according to the fourth aspect, the chip system according to the fifth aspect, and the computer program product according to the sixth aspect are all configured to perform the foregoing corresponding method. Therefore, for beneficial effects that can be achieved by them, refer to beneficial effects in the foregoing corresponding method. Details are not described herein again.

DESCRIPTION OF EMBODIMENTS

When a network device performs communication by using an MM technology, when needing to communicate with a user in a signal coverage area of the network device, the network device may transmit a narrow beam to a direction in which the user is located, to communicate with the user over the narrow beam. Similarly, when needing to communicate with a plurality of users, the network device may send a plurality of corresponding narrow beams in different directions.

Figure 1:
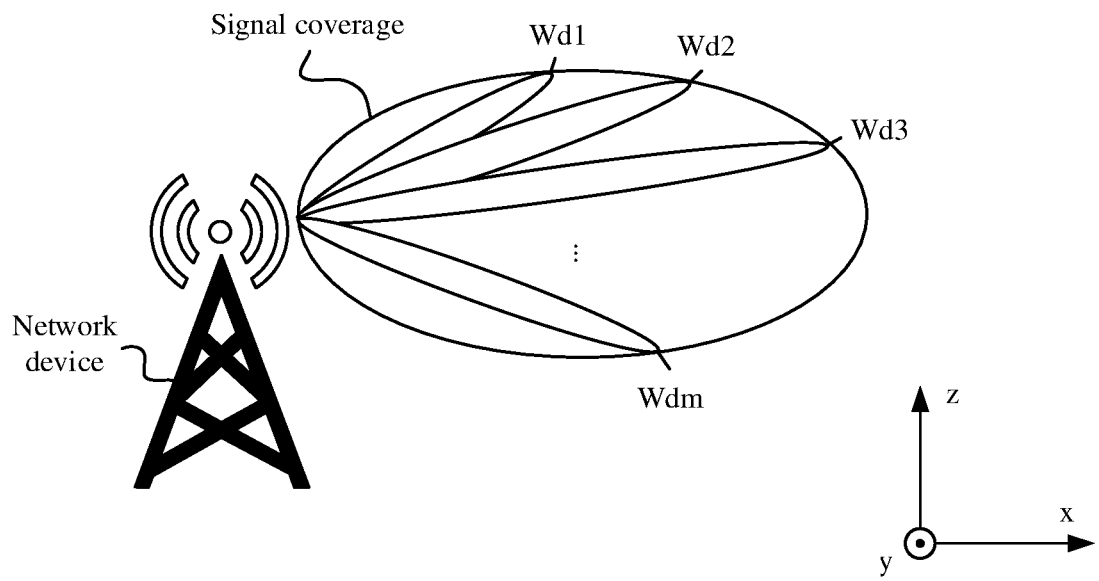
FIG. 1 is a schematic diagram in which a network device transmits a plurality of narrow beams for communication.

For example, FIG. 1 is a schematic diagram in which a network device transmits a plurality of narrow beams for communication. As shown in FIG. 1, in signal coverage, the network device may transmit a plurality of narrow beams (for example, Wd1, Wd2, Wd3, . . . , and Wdm). The network device may perform downlink data transmission with a user 1 (where the user 1 may be a user having a same direction as Wd1) over Wd1. Similarly, the network device may perform downlink data transmission with a user 2 (where the user 2 may be a user having a same direction as Wd2) over Wd2.

When the network device performs communication over the narrow beams, a corresponding electromagnetic wave exists in a direction covered by each narrow beam. In an actual working scenario, the network device transmits a narrow beam to a direction in which a user is located, only after determining that the network device needs to communicate with the user. Therefore, in a signal coverage area of the network device, EMF strength in each direction varies with a communication requirement. For example, in an area in which a communication requirement is strong, EMF strength in the corresponding area is strong. For another example, in an area in which a communication requirement is weak, EMF strength in the corresponding area is also weak.

To meet requirements of regulations on EMF strength of each direction in signal coverage, the network device may divide the signal coverage into a plurality of grids, and monitor each grid in real time (or periodically), to ensure that EMF strength does not exceed a standard in a working process. The following describes a grid division method by using an example.

Figure 2:
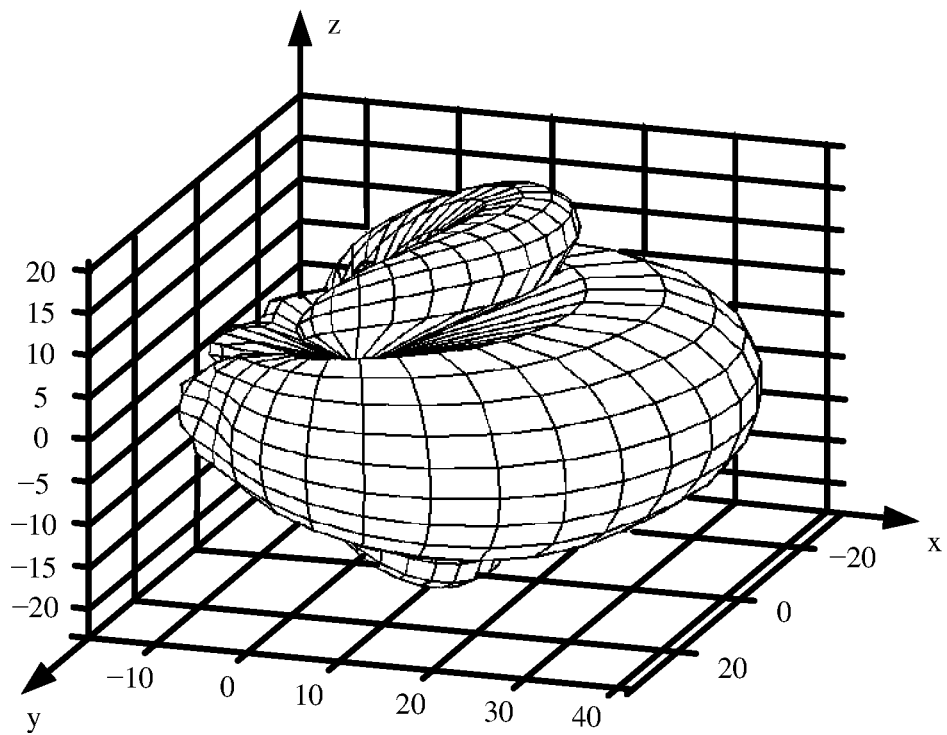
FIG. 2 is a schematic diagram of gain distribution of a signal of a network device.

FIG. 2 is a schematic diagram of gain distribution of a signal of a network device. It should be understood that the gain distribution of the signal may be used to represent a signal coverage status. The following uses an example in which the signal coverage status of the network device corresponds to the gain distribution shown in FIG. 2, and the network device needs to perform EMF strength monitoring in signal coverage having a −10 dB gain. As shown in FIG.

Figure 3A:
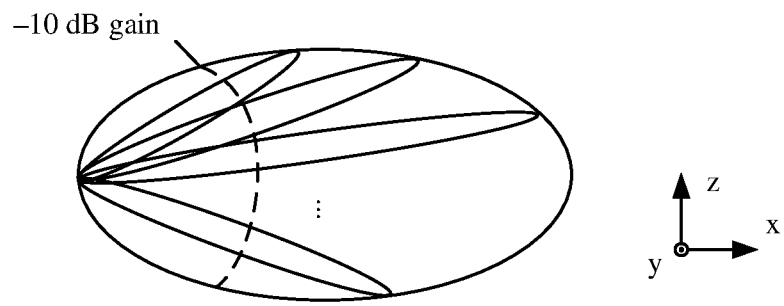
FIGS. 3A and 3B are schematic diagrams of grid division.
Figure 3B:
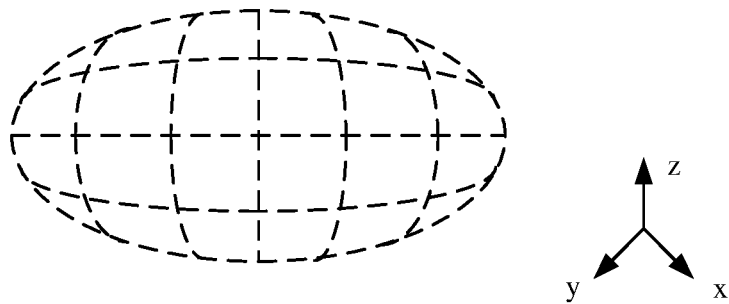

3A, the network device may evenly divide, separately on an XOY plane and an XOZ (and/or a YOZ) plane, an area having a −10 dB gain in the gain distribution shown in FIG. 2 into a plurality of areas having a same opening angle, to obtain a plurality of grids shown in FIG. 3B. In this way, the area having the −10 dB gain is evenly divided, and the corresponding grids are obtained, to perform EMF strength monitoring. In this application, the EMF strength monitoring may also be referred to as EMF monitoring.

When performing EMF strength monitoring on each grid, the network device may determine power projections of a beam in different directions by monitoring a parameter on a transmit link that sends an electromagnetic wave covering a corresponding grid, and then calculate and determine EMF strength of a location of the grid. After determining EMF strength of each grid, the network device may adjust the parameter on the transmit link based on the EMF strength of each grid (for example, perform power limitation), so that the EMF strength of each grid can meet regulation requirements.

It should be noted that, to increase monitoring precision of a traffic beam pointing to a grid, unified grid refinement needs to be performed on an entire cell. Therefore, an all-cell operation requirement corresponding to the network device is increased. However, in actual work, power limitation needs to be performed only when energy directions are relatively concentrated in an area or several areas. Therefore, the unified grid refinement increases invalid monitoring pressure on the network device by a large amount.

To resolve the foregoing problem, at least one embodiment of this application provides an EMF strength control method, to flexibly adjust a grid size, so that EMF monitoring precision of the network device is effectively improved, and at the same time, excessive monitoring pressure is not brought to the network device.

The following describes in detail technical solutions provided in embodiments of this application with reference to the accompanying drawings.

Figure 4:
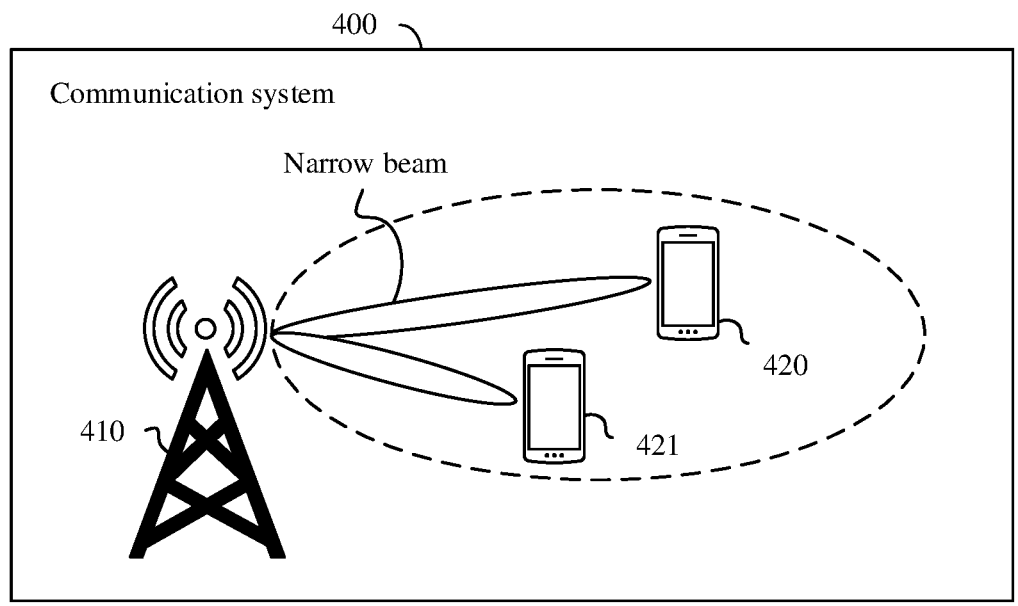
FIG. 4 is a schematic composition diagram of a communication system according to at least one embodiment of this application.

FIG. 4 is a schematic composition diagram of a communication system 400 according to at least one embodiment of this application. As shown in FIG. 4, the communication system 400 may include a network device 410 and a terminal 420. It should be noted that the communication system 400 may further include another terminal other than 420. For example, the communication system 400 may further include a terminal 421 shown in FIG. 4. A quantity of terminals included in the communication system 400 is not limited in embodiments of this application. For example, the terminal (which may also be referred to as a terminal device) in embodiments of this application may be user equipment (UE), a mobile phone, a tablet computer, a desktop computer, a laptop computer, a handheld computer, a notebook computer, an ultra-mobile personal computer (UMPC), a netbook, or an electronic device such as a cellular phone, a personal digital assistant (PDA), an augmented reality (AR)/virtual reality (VR) device, or a media player. A specific form of the device is not specially limited in embodiments of this application.

In the communication system 400, the network device 410 may be a base station, in a 5th generation mobile communication technology (5G), that can perform MM communication (namely, communication performed by using an MM technology). It should be understood that, in some other embodiments, the network device 410 may alternatively be a 3rd generation mobile communication technology (3G) or 4th generation mobile communication technology (4G) base station that can support MM communication, or another communication device. For example, the network device 410 is a 5G base station. The network device 410 can provide 5G new radio (NR) to perform 5G communication with another device (for example, the terminal 420 and/or the terminal 421). In the network device 410, a baseband module may be disposed, to collect information such as transmit power in different directions. The baseband module may be further configured to adjust EMF strength in signal coverage of the network device 410 by adjusting a signal parameter. In addition, in some embodiments, the network device may include a transmitter chain and a receiver chain. A person of ordinary skill in the art can understand that the transmitter chain and the receiver chain each may include a plurality of components (for example, a processor, a modulator, a multiplexer, encoder, a demultiplexer, and an antenna) related to signal sending and receiving.

The network device 410 may perform communication (for example, downlink data transmission) with a terminal in a corresponding direction over a beam. In at least one embodiment of this application, by monitoring EMF strength in different preset grids, the network device 410 may adjust a size of the grid. For example, the network device 410 may combine two or more grids with low EMF strength into one grid. For another example, the network device 410 may divide a grid with high EMF strength into two or more small grids. In this way, the network device 410 may adaptively adjust sizes and a quantity of grids based on current communication requirement distribution, so that EMF monitoring efficiency of the network device 410 can be effectively increased. Generally, a quantity of grids that need to be combined is significantly greater than a quantity of grids that need to be split. Therefore, EMF monitoring pressure of the network device 410 can be reduced.

The EMF strength control methods provided in embodiments of this application can all be used in the communication system 400 shown in FIG. 4.

The following describes in detail an EMF strength control method provided in at least one embodiment of this application.

Figure 5:
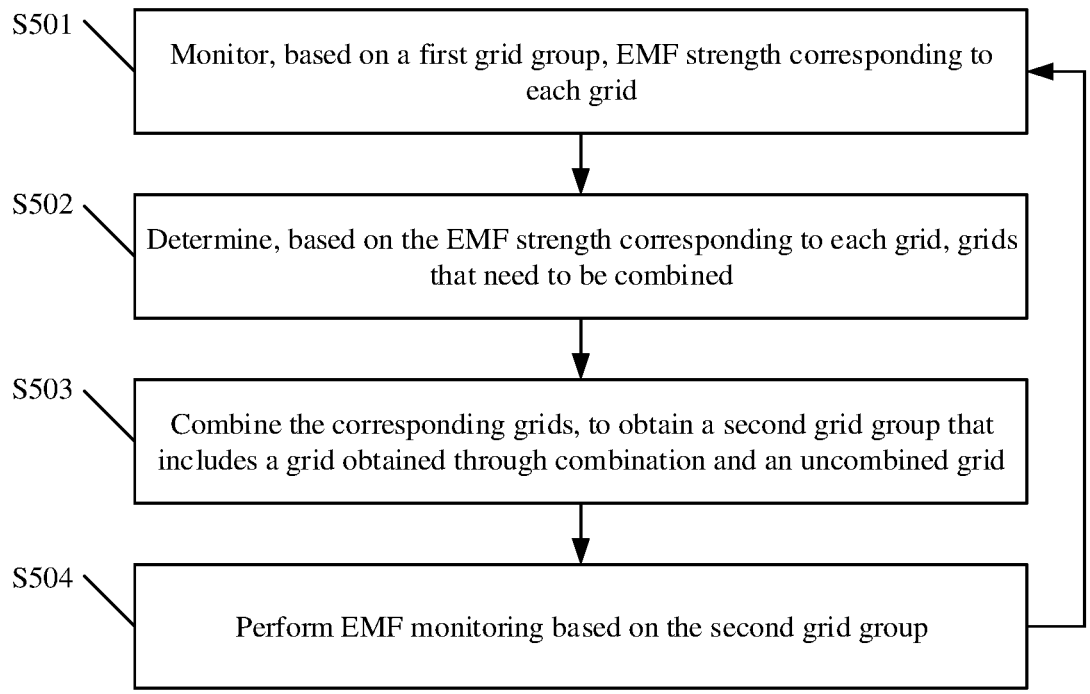
FIG. 5 is a flowchart of an EMF strength control method according to at least one embodiment of this application.

As shown in FIG. 5, the method may include S501 to S504.

S501: Monitor, based on a first grid group, EMF strength corresponding to each grid.

The first grid group may include M grids, and each grid corresponds to one sub-area in a coverage area of a network device signal. M is an integer greater than or equal to 2. In this example, setting parameters (for example, a horizontal opening angle and a vertical opening angle of each of the M grids) of the first grid group may be preset in the network device, or may be obtained by the network device based on historical data, or may be updated in real time according to a received instruction. This is not limited in at least one embodiment of this application.

In at least one embodiment of this application, the network device may monitor the EMF strength of each grid in the first grid group, to obtain M EMF strength monitoring results that are in a one-to-one correspondence with the M grids. A specific method for obtaining the EMF strength is similar to that in the foregoing descriptions, and details are not described herein again.

Figure 6:
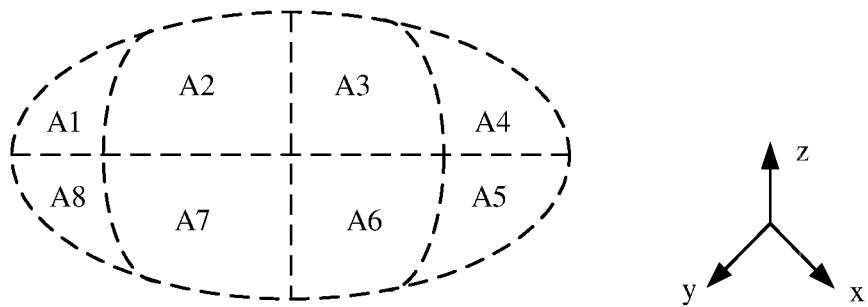
FIG. 6 is a schematic diagram of grid division according to at least one embodiment of this application.

For example, with reference to FIG. 6, an example in which M=8 and the first grid group includes A1, A2, A3, A4, A5, A6, A7 and A8 grids in FIG. 6 is used. The network device may monitor EMF strength of the eight grids in the first grid group, to obtain EMF strength corresponding to each grid. For example, the network device may determine EMF strength EMF1 corresponding to A1. Similarly, the network device may determine EMF strength EMF2 corresponding to A2, EMF strength EMF3 corresponding to A3, EMF strength EMF4 corresponding to A4, EMF strength EMF5 corresponding to A5, EMF strength EMF6 corresponding to A6, EMF strength EMF7 corresponding to A7, and EMF strength EMF8 corresponding to A8.

It should be noted that, in at least one embodiment of this application, the network device may use EMF strength of each grid that is obtained through monitoring at a moment, as EMF strength of the corresponding grid. In some other embodiments, the network device may continuously monitor EMF strength of each grid on a fixed or non-fixed frequency within preset time (for example, monitor the EMF strength of each grid on a frequency of once every 1 millisecond within 1 second), and average the plurality of pieces of EMF strength that correspond to each grid and that are obtained within the preset time, to obtain an average value of the EMF strength of each grid within the preset time, and use the average value as EMF strength of the corresponding grid.

It should be understood that a communication requirement status in an area in which each grid is located can be more accurately determined by calculating average EMF strength of the grid in a period of time (for example, preset time), and an EMF strength status of the grid can be more accurately identified by using an average EMF value obtained through the average calculation as EMF strength of the corresponding grid. In a specific implementation process, a manner of determining the EMF strength of the grid may be flexibly selected based on an actual situation. This is not limited in at least one embodiment of this application.

S502: Determine, based on the EMF strength corresponding to each grid, grids that need to be combined.

The network device may determine, based on the EMF strength of each grid obtained in S501, the grids that need to be combined.

In this example, the network device may determine communication requirement strength distribution at the current moment based on the EMF strength of each grid in the first grid group. It should be understood that EMF strength distribution is related to a current requirement on communication. For example, in an area corresponding to a grid having high EMF strength, a terminal has a strong requirement on communication. Correspondingly, in an area corresponding to a grid having low EMF strength, the terminal has a relatively weak requirement on communication. For an area in which a communication requirement of the terminal is relatively weak, if the network device performs EMF strength monitoring on each grid still based on division of the first grid group, EMF strength of a plurality of adjacent grids may be close and low. Consequently, efficiency of the EMF strength monitoring of the network device is reduced, and a related monitoring resource in the network device is wasted.

Therefore, in at least one embodiment of this application, adjacent grids that each have low EMF strength may be determined as grids that need to be combined.

For example, in some implementations, the network device may determine, based on a value relationship between EMF strength of each grid and a first threshold, whether the corresponding grid needs to be combined. For example, still with reference to FIG. 6, in the eight grids included in the first grid group, both the EMF strength EMF2 corresponding to A2 and the EMF strength EMF7 corresponding to A7 are lower than the first threshold. In addition, A2 is adjacent to A7. In this case, the network device may determine that A2 and A7 are grids that need to be combined.

In some other implementations, the network device may sort EMF strength of the M grids, and determine grids that each have low EMF strength and that are adjacent to each other as grids that need to be combined. For example, with reference to FIG. 6, an example in which the EMF strength of the eight grids is sorted in descending order as EMF6>EMF8>EMF3>EMF4>EMF1>EMF5>EMF7>EMF2 is used. The network device may determine adjacent grids that are in N grids having smallest EMF strength as grids that need to be combined. Using N=3 as an example, in all the eight grids, three grids that have smallest EMF strength are A5, A7, and A2. In the three grids, A2 and A7 are adjacent to each other. Therefore, the network device may determine A2 and A7 as grids that need to be combined.

It should be noted that the methods for determining grids that need to be combined in the foregoing two examples are merely examples. In some other implementations of this application, the network device may alternatively determine, according to another method, grids that need to be combined. For example, the network device may determine, as grids that need to be combined, adjacent grids in grids that each have EMF strength lower than average EMF strength of all grids. This is not limited in at least one embodiment of this application.

In addition, in some implementations, the network device may perform S502 when determining that there is a grid combination requirement. For example, when processing pressure of the network device is high, the network device may determine that there is a grid combination requirement. For example, by using parameters such as processor usage and memory usage in a current running process, the network device may determine whether the processing pressure is high.

S503: Combine the corresponding grids, to obtain a second grid group that includes a grid obtained through combination and an uncombined grid.

S504: Perform EMF monitoring based on the second grid group.

After determining the grids that need to be combined, the network device may combine the corresponding grids, to obtain an updated grid. The updated grid (for example, the grid obtained through combination) and the uncombined grid may form the second grid group.

It may be understood that, with reference to the descriptions in FIGS. 3A-3B, different grids have different horizontal opening angle ranges and/or vertical opening angle ranges. Therefore, an opening angle of the updated grid may be obtained based on horizontal opening angles and/or vertical opening angles of the grids that need to be combined, so that an updated grid group (for example, the second grid group) including the grid obtained through combination and the uncombined grid may be obtained.

For example, A2 and A7 need to be combined, A2 has a horizontal opening angle range of 15° to 30° and a vertical opening angle range of 45° to 60°, and A7 has a horizontal opening angle range of 30° to 45° and a vertical opening angle range of 45° to 60°. The network device may determine, based on opening angle statuses of A2 and A7, that an opening angle of the grid (for example, A2&A7) obtained through combination is a horizontal opening angle of 15° to 45° and a vertical opening angle of 45° to 60°. In this way, the network device may obtain the updated grid shown in FIG. 7.

After obtaining the second grid group, when the network device needs to perform EMF monitoring, the network device may perform EMF monitoring based on the second grid group. It can be learned that because a quantity of grids in the second grid group is definitely lower than a quantity of grids in the first grid group, when EMF monitoring is performed based on the second grid group, EMF monitoring pressure of the network device can be effectively reduced, and EMF monitoring efficiency can be improved.

It should be noted that in at least one embodiment of this application, the operation of obtaining, by the network device, the EMF strength of each grid in the first grid group may be performed spontaneously based on a preset periodicity. For example, when the network device is powered on, the network device obtains the EMF strength corresponding to each grid in the first grid group, and then performs S501 to S504. After preset duration elapses, for stored information about a first grid group (for example, the first grid group may be the second grid group obtained through previous processing, or may be a preset first grid group), the network device may obtain EMF strength of each grid in the grid group, and then perform S501 to S504 again. In this way, the network device may periodically maintain, based on a change of a current communication status, the grids on which the EMF monitoring is performed, to implement continuous adaptive adjustment of the grids.

In some other embodiments, the network device may alternatively perform S501 to S504 after receiving an EMF strength obtaining instruction, to implement adaptive adjustment of the grids. In this way, S501 is performed only when adjustment needs to be performed, so that the processing pressure of the network device can be further reduced.

In this way, a grid size is adaptively adjusted (for example, adjacent grids that each have a small EMF are combined), to reduce a quantity of grids. Therefore, the processing pressure caused by the EMF monitoring of the network device is effectively reduced without affecting an EMF monitoring capability.

Figure 8:
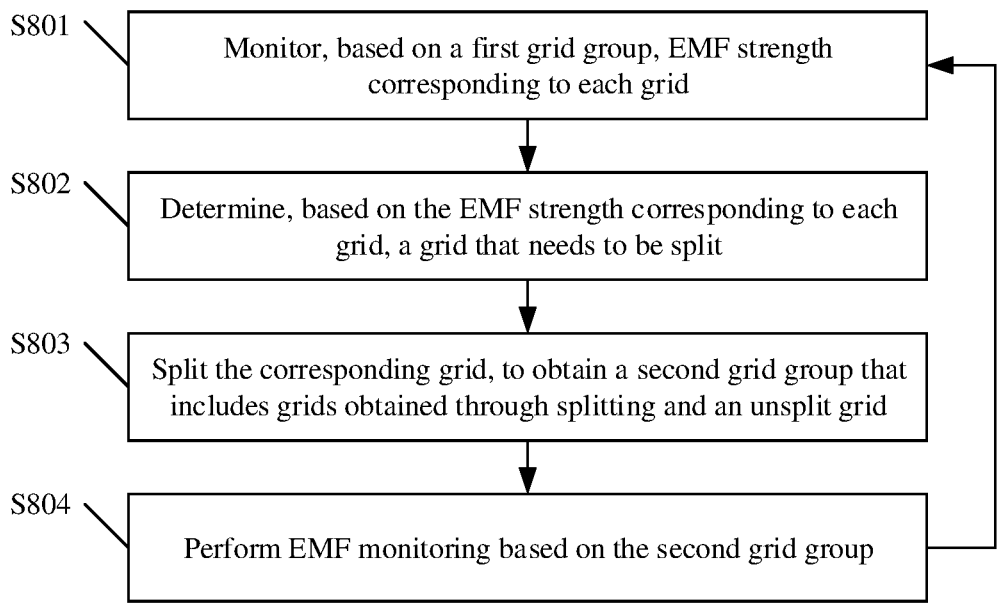
FIG. 8 is a schematic flowchart of another EMF strength control method according to at least one embodiment of this application.

FIG. 8 is a schematic flowchart of another EMF strength control method according to at least one embodiment of this application. As shown in FIG. 8, the method may include S801 to S804.

S801: Monitor, based on a first grid group, EMF strength corresponding to each grid.

An execution manner of S801 in this example is similar to an execution method of S501 shown in FIG. 5, and details are not described herein again.

S802: Determine, based on the EMF strength corresponding to each grid, a grid that needs to be split.

It should be understood that EMF strength distribution is related to a real-time communication requirement in a current cell (that is, in a signal coverage area of the network device). To be specific, when a communication requirement in an area in the cell is strong, corresponding EMF strength is also strong. When a communication requirement in an area in the cell is weak, corresponding EMF strength is also weak. Therefore, when EMF strength in an area in the cell is high, if EMF monitoring is performed still by using a preset first grid group or by using a first grid group obtained from historical data, the EMF monitoring in the area is not precise enough. Consequently, the network device cannot accurately perform power control on a narrow beam in the corresponding area. Therefore, in this example, the network device may split a grid whose EMF strength is greater than a second threshold, to divide the area with the high EMF strength into two or more grids for separate monitoring, so that monitoring precision is improved.

S803: Split the corresponding grid, to obtain a second grid group that includes grids obtained through splitting and an unsplit grid.

S804: Perform EMF monitoring based on the second grid group.

Figure 7:
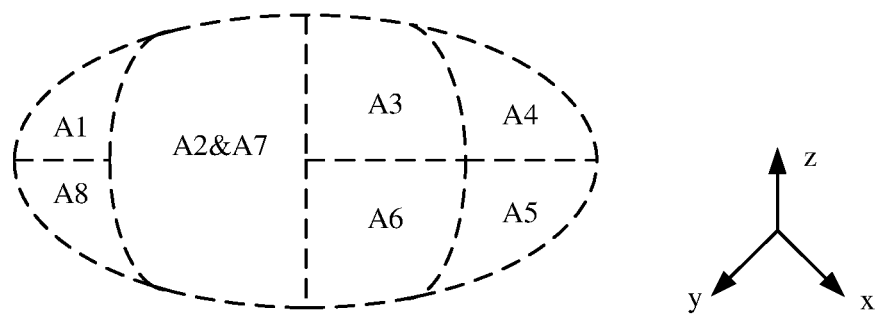
FIG. 7 is a schematic diagram of another type of grid division according to at least one embodiment of this application.
Figure 9:
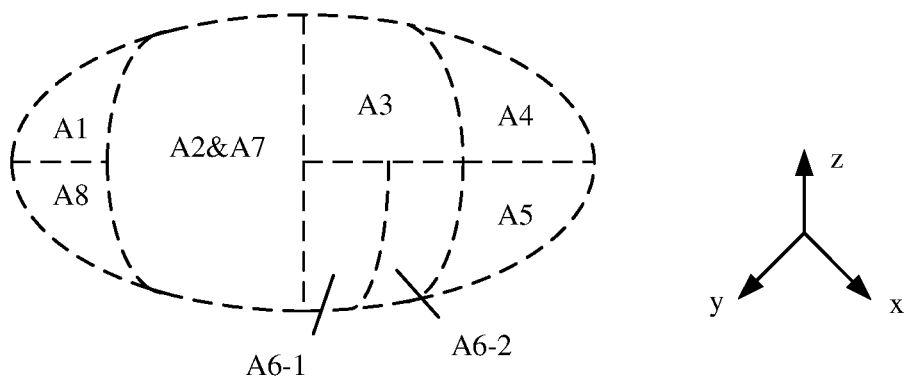
FIG. 9 is a schematic diagram of another type of grid division according to at least one embodiment of this application.

For example, the first grid group has grid distribution shown in FIG. 7, and EMF strength of A6 is greater than the second threshold. When determining that the EMF strength (for example, EMF6) of A6 is greater than the second threshold, the network device may determine that A6 needs to be split into more grids for EMF monitoring. In some implementations, the network device may evenly divide (or based on EMF strength distribution in A6, unevenly divide) an area covered by A6 into P sub-areas, where each area corresponds to one updated new grid, and P is an integer greater than or equal to 2. For example, when P=2, new grids shown in FIG. 9 may be obtained. The new grids may include a grid A6-1 and a grid A6-2 that are obtained by splitting A6. In some other implementations, the network device may determine, based on EMF scanning results of other grids adjacent to A6, a quantity of grids into which A6 needs to be split and a coverage size of each grid. This is not limited in at least one embodiment of this application.

It should be noted that because an operation of grid splitting increases the processing pressure of the network device for performing EMF monitoring, in some implementations, a processing capability of the network device also needs to be considered during the grid splitting, so that a problem of excessively high processing pressure caused by an increase in a quantity of grids does not occur when the network device performs EMF monitoring based on an updated grid.

In an example, before splitting the grid, the network device may determine whether a total quantity of grids obtained through splitting exceeds a preset quantity of grids (for example, a third threshold). If the total quantity of grids exceeds the preset quantity of grids, a problem of excessively high processing pressure may occur when the network device performs EMF monitoring based on a grid group obtained through splitting. In this case, the network device may properly reduce a quantity of grids that need to be split, or may properly reduce a quantity of small grids obtained through splitting, or may not perform grid splitting, to ensure that the network device does not have excessively high processing pressure when performing EMF monitoring based on the updated grid.

In some instances of this application, the network device may determine, based on the obtained EMF strength of each grid in the first grid group, a transmit power value of a narrow beam in an area corresponding to each grid. Based on the transmit power value, the network device may determine available transmit power of a narrow beam in a corresponding direction through comparison with a maximum transmit power value that can be provided by the network device. Based on the available transmit power, the network device can clearly determine whether the processing pressure may be excessively high. Therefore, the network device may determine, based on the available transmit power, whether to split a grid in the corresponding direction and a quantity of grids obtained through splitting.

Therefore, the network device may adaptively adjust, based on the EMF strength of each grid in the first grid group, the grids on which the EMF monitoring is performed (for example, increase a quantity of grids in an area with high EMF strength), to perform EMF strength monitoring more accurately.

It should be noted that in different implementation scenarios, the EMF strength control method shown in FIG. 5 and the EMF strength control method shown in FIG. 8 may be used separately or simultaneously according to a requirement, to further optimize the EMF monitoring. To enable a person skilled in the art to more clearly understand implementation processes of the technical solutions provided in this application, the following uses an example in which the EMF strength control methods shown in FIG. 5 and FIG. 8 are simultaneously used, to describe an implementation process thereof.

Figure 10:
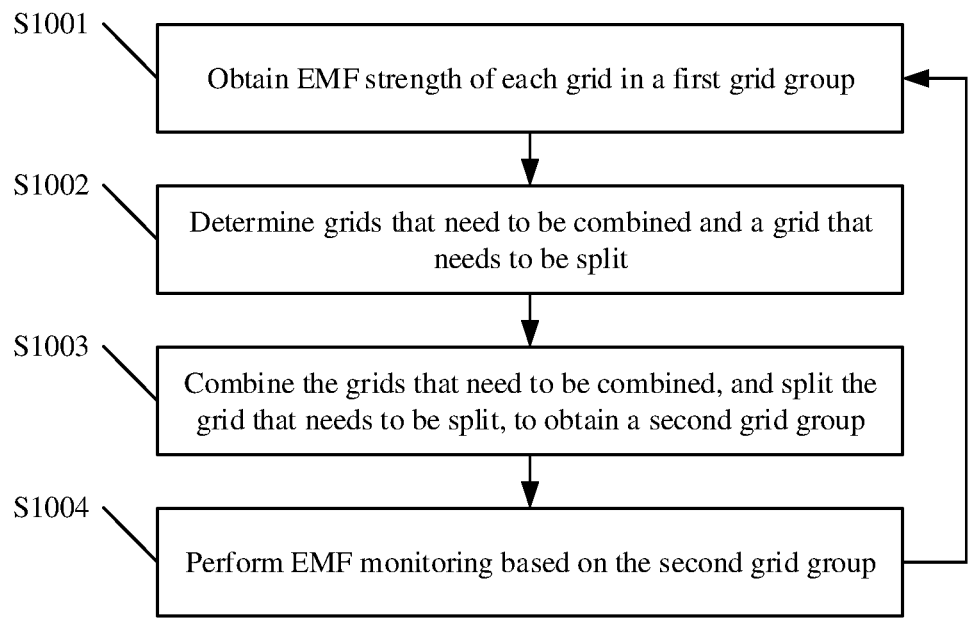
FIG. 10 is a schematic flowchart of another EMF strength control method according to at least one embodiment of this application.

As shown in FIG. 10, the method may include S1001 to S1004.

S1001: Obtain EMF strength of each grid in a first grid group.

S1002: Determine grids that need to be combined and a grid that needs to be split.

S1003: Combine the grids that need to be combined, and split the grid that needs to be split, to obtain a second grid group.

S1004: Perform EMF monitoring based on the second grid group.

It should be understood that, for an execution manner of S1001 to S1004, refer to the foregoing descriptions of FIG. 5 and/or FIG. 8. Details are not described herein again.

It should be noted that, when a network device performs S1003, when the grid splitting is performed, if a processing capability of the network device does not allow EMF monitoring to be performed on grids obtained through splitting, the network device may perform other proper processing for this.

For example, in some implementations, when the network device determines that the processing capability of the network device is not strong enough, the network device may not perform grid splitting, but may only combine the grids that need to be combined, to obtain an updated grid, and continue to perform S1004.

In some other implementations, when determining that the processing capability of the network device is not strong enough, the network device may determine a communication priority in an area covered by the grid that needs to be split, and selectively perform a subsequent operation according to the priority. For example, when the communication priority is high, the network device may combine grids in an area with a low communication priority in the first grid group, to release a processing capability, and split the grid that needs to be split, to obtain an updated grid, and perform EMF monitoring on the updated grid. In this way, a processing capability is transferred to an area with a high communication priority, so that the network device can implement high-precision monitoring and adjustment on the area with the high communication priority.

It should be noted that, in this example, a communication priority may be determined based on a type of ongoing communication. For example, when the current ongoing communication is a call service such as a data call, it is determined that a priority of the communication is high. When the current ongoing communication is a data service such as picture browsing, it is determined that a priority of the communication is low. For another example, when a terminal in communication is a VIP customer, it is considered that a priority of the communication is high; or when a terminal in communication is an ordinary customer, it is considered that a priority of the communication is low. Certainly, the priority of the communication may alternatively be determined according to another policy. The policy may be preset in the network device, or may be flexibly configured. This is not limited in at least one embodiment of this application.

The foregoing mainly describes the solutions provided in embodiments of this application from a perspective of the network device. To implement the foregoing functions, the network device includes corresponding hardware structures and/or software modules for performing the functions. A person skilled in the art should easily be aware that, in combination with units and algorithm steps of the examples described in embodiments disclosed in this specification, this application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In embodiments of this application, functional modules of the network device may be obtained through division according to the foregoing method examples. For example, the functional modules may be obtained through division in correspondence to various functions, or two or more functions may be integrated into one processing module. The integrated module may be implemented in a form of hardware, or may be implemented in a form of a software function module. It should be noted that, in embodiments of this application, module division is an example, and is merely logical function division. In actual implementation, another division manner may be used.

Figure 11:
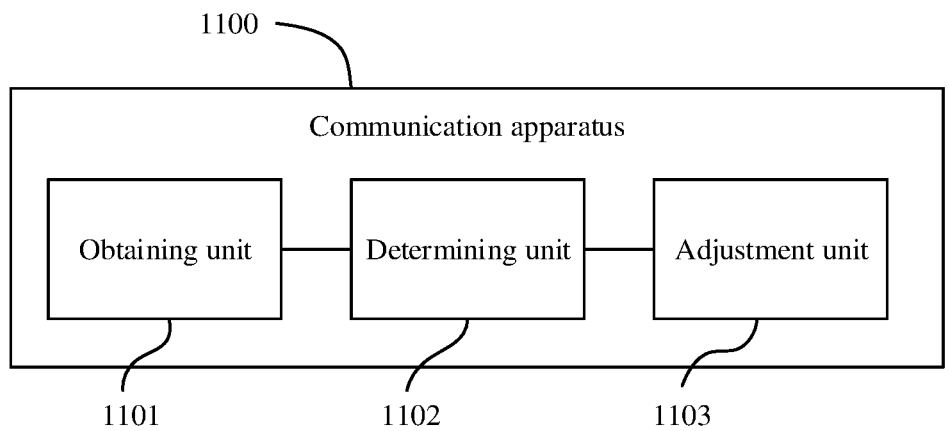
FIG. 11 is a schematic composition diagram of a communication apparatus according to at least one embodiment of this application.

FIG. 11 is a schematic block diagram of a communication apparatus 1100 according to at least one embodiment of this application. The communication apparatus 1100 may be disposed in the network device 410 shown in FIG. 4, to implement any EMF strength control method provided in embodiments of this application.

As shown in FIG. 11, the communication apparatus 1100 may include an obtaining unit 1101, configured to obtain EMF strength of each grid in a first grid group, where the first grid group includes M grids obtained by dividing a signal coverage area of the network device, and M is an integer greater than 1; a determining unit 1102, configured to determine a second grid group based on EMF strength of the M grids, where the second grid group includes at least a first grid and a second grid, a coverage area of the first grid is greater than that of the second grid, and EMF strength of the first grid is lower than EMF strength of the second grid; and an adjustment unit 1103, configured to monitor the EMF strength of the M grids based on the second grid group, to adjust EMF strength in the coverage area of the network device (that is, in a cell corresponding to the network device).

In a possible implementation, the determining unit 1102 is specifically configured to: combine, based on the EMF strength of the M grids, two or more adjacent grids that each have EMF strength lower than a first threshold in the M grids; and determine a grid obtained through combination and an uncombined grid as the second grid group.

In a possible implementation, the determining unit 1102 is specifically configured to: split, based on the EMF strength of the M grids, a grid whose EMF strength is greater than a second threshold in the M grids; and determine grids obtained through splitting and an unsplit grid as the second grid group.

In a possible implementation, the determining unit 1102 is specifically configured to: based on the EMF strength of the M grids, combine two or more adjacent grids that each have EMF strength lower than a first threshold in the M grids, and split a grid whose EMF strength is greater than a second threshold in the M grids; and determine a grid obtained through combination, grids obtained through splitting, and an uncombined grid/unsplit grid as the second grid group.

In a possible implementation, the determining unit 1102 is further configured to determine that a quantity of grids in the second grid group obtained through splitting is lower than a third threshold.

In a possible implementation, EMF strength of the grid is an average value of EMF strength of the grid within preset time.

In a possible implementation, the determining unit 1102 is further configured to determine current available transmit power based on the EMF strength of the M grids; and the determining unit 1102 is further configured to determine the second grid group based on the current available transmit power.

It should be noted that all related content of the steps in the foregoing method embodiments may be cited in function descriptions of corresponding functional modules. Details are not described herein again. Optionally but not necessarily, when necessary, the communication apparatus 1100 provided in at least one embodiment of this application may further include a processing module or a control module configured to support the obtaining unit 1101 and/or the determining unit 1102 and/or the adjustment unit 1103 in completing a corresponding function.

Figure 12:
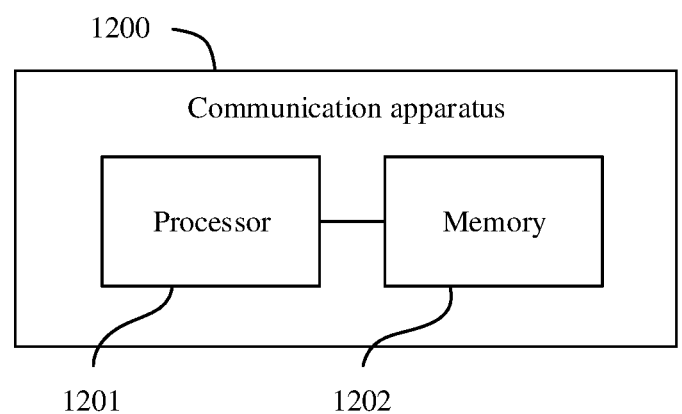
FIG. 12 is a schematic composition diagram of another communication apparatus according to at least one embodiment of this application.

FIG. 12 is a schematic composition diagram of another communication apparatus 1200. The communication apparatus 1200 may include a processor 1201 and a memory 1202. The memory 1202 is configured to store computer-executable instructions. For example, in some embodiments, when the processor 1201 executes the instructions stored in the memory 1202, the communication apparatus 1200 is enabled to perform S501 to S504 shown in FIG. 5, or perform S801 to S804 shown in FIG. 8, or perform S1001 to S1004 shown in FIG. 10, and another operation that needs to be performed by a network device.

It should be noted that all related content of the steps in the foregoing method embodiments may be cited in function descriptions of corresponding functional modules. Details are not described herein again.

Figure 13:
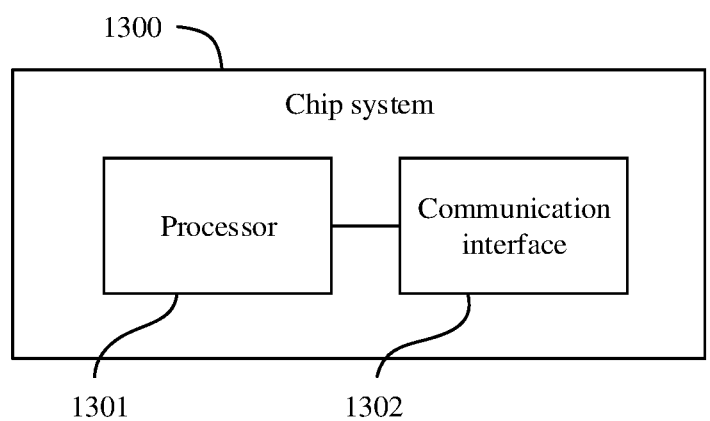
FIG. 13 is a schematic composition diagram of a chip system according to at least one embodiment of this application.

FIG. 13 is a schematic composition diagram of a chip system 1300. The chip system 1300 may include a processor 1301 and a communication interface 1302, to support a network device in implementing the functions in the foregoing embodiments. In a possible design, the chip system 1300 further includes a memory, configured to store program instructions and data necessary for the network device. The chip system 1300 may include a chip, or may include a chip and another discrete device.

It should be noted that all related content of the steps in the foregoing method embodiments may be cited in function descriptions of corresponding functional modules. Details are not described herein again.

All or a part of functions, actions, operations, steps, and the like in the foregoing embodiments may be implemented by using software, hardware, firmware, or any combination thereof. When a software program is used for implementation, all or a part may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a dedicated computer, a computer network, or other programmable apparatuses. The computer instructions may be stored in a non-transitory computer-readable storage medium, or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

Although this application is described with reference to specific features and embodiments thereof, it is clear that various modifications and combinations may be made to them without departing from the spirit and scope of this application. Correspondingly, the specification and accompanying drawings are merely example descriptions of this application defined by the appended claims, and are considered as having covered any of or all modifications, variations, combinations, or equivalents in the scope of this application. It is clearly that a person skilled in the art can make various modifications and variations to this application without departing from the spirit and scope of this application. This application is intended to cover these modifications and variations of this application provided that they fall within the scope of protection defined by the following claims and their equivalent technologies.

The invention claimed is:

1. A method, performed at a network device, wherein the method comprises:
    obtaining electromagnetic field strength of each grid in a first grid group, wherein the first grid group comprises M grids obtained by dividing a signal coverage area of the network device, and M is an integer greater than 1;
    determining a second grid group based on the electromagnetic field strength of the M grids, wherein the second grid group comprises at least a first grid and a second grid, a coverage area of the first grid is greater than that of the second grid, and electromagnetic field strength of the first grid is lower than electromagnetic field strength of the second grid; and
    monitoring electromagnetic field strength of the signal coverage area of the network device based on the second grid group, to adjust the electromagnetic field strength of the signal coverage area.

2. The method according to claim 1, wherein the determining the second grid group comprises:
    combining, based on the electromagnetic field strength of the M grids, two or more adjacent grids each having the electromagnetic field strength lower than a first threshold in the M grids; and
    determining the second grid group as including:
        a grid obtained through the combining, and
        one or more uncombined grids among the M grids.

3. The method according to claim 1, wherein the determining the second grid group comprises:

splitting, based on the electromagnetic field strength of the M grids, a grid whose electromagnetic field strength is greater than a second threshold in the M grids; and determining the second grid group as including:
grids obtained through the splitting, and
one or more unsplit grids among the M grids.

4. The method according to claim 1, wherein the determining the second grid group comprises:
based on the electromagnetic field strength of the M grids,
combining, two or more adjacent grids each having the electromagnetic field strength lower than a first threshold in the M grids, and
splitting a grid whose electromagnetic field strength is greater than a second threshold in the M grids; and
determining the second grid group as including:
a grid obtained through the combining,
grids obtained through the splitting, and
one or more uncombined and unsplit grids among the M grids.

5. The method according to claim 3, further comprising, before the splitting,
determining that a quantity of grids in the second grid group obtained through splitting is lower than a third threshold.

6. The method according to claim 1, wherein the electromagnetic field strength of a grid in the first grid group or the second grid group is an average value of electromagnetic field strength of the grid within preset time.

7. The method according to claim 1, further comprising:
determining current available transmit power based on the electromagnetic field strength of the M grids;
wherein the determining the second grid group comprises:
determining the second grid group based on the current available transmit power.

8. A communication apparatus, comprising:
a processor and a memory, wherein the memory is configured to store a computer program, and the processor is configured to execute the computer program stored in the memory, wherein the computer program, when executed, instructs the processor to:
obtain electromagnetic field strength of each grid in a first grid group, wherein the first grid group comprises M grids obtained by dividing a signal coverage area of a network device, and M is an integer greater than 1;
determine a second grid group based on the electromagnetic field strength of the M grids, wherein the second grid group comprises at least a first grid and a second grid, a coverage area of the first grid is greater than that of the second grid, and electromagnetic field strength of the first grid is lower than electromagnetic field strength of the second grid; and
monitor electromagnetic field strength of the signal coverage area of the network device based on the second grid group, to adjust the electromagnetic field strength of the signal coverage area.

9. The communication apparatus according to claim 8, wherein the computer program, when executed, further instructs the processor to:
perform, based on the electromagnetic field strength of the M grids, combining two or more adjacent grids each having the electromagnetic field strength lower than a first threshold in the M grids; and
determine the second grid group as including:
a grid obtained through the combining, and
one or more uncombined grids among the M grids.

10. The communication apparatus according to claim 8, wherein the computer program, when executed, further instructs the processor to:
perform, based on the electromagnetic field strength of the M grids, splitting a grid whose electromagnetic field strength is greater than a second threshold in the M grids; and
determine the second grid group as including:
grids obtained through the splitting, and
one or more unsplit grids among the M grids.

11. The communication apparatus according to claim 8, wherein the computer program, when executed, further instructs the processor to:
perform, based on the electromagnetic field strength of the M grids,
combining two or more adjacent grids each having the electromagnetic field strength lower than a first threshold in the M grids, and
splitting a grid whose electromagnetic field strength is greater than a second threshold in the M grids; and
determine the second grid group as including:
a grid obtained through the combining,
grids obtained through the splitting, and
one or more uncombined and unsplit grids among the M grids.

12. The communication apparatus according to claim 10, wherein the computer program, when executed, further instructs the processor to:
before the splitting, determine that a quantity of grids in the second grid group obtained through splitting is lower than a third threshold.

13. The communication apparatus according to claim 8, wherein the electromagnetic field strength of a grid in the first grid group or the second grid group is an average value of electromagnetic field strength of the grid within preset time.

14. The communication apparatus according to claim 8, wherein the computer program, when executed, further instructs the processor to:
determine current available transmit power based on the electromagnetic field strength of the M grids; and
determine the second grid group based on the current available transmit power.

* * * * *